US008861528B2

(12) United States Patent
Josiam et al.

(10) Patent No.: US 8,861,528 B2
(45) Date of Patent: Oct. 14, 2014

(54) APPARATUS AND METHOD FOR RESOURCE SELECTION IN OFDMA SYSTEMS

(75) Inventors: Kaushik Josiam, Dallas, TX (US); Qi Wu, Beijing (CN); Heewon Kang, Seongnam-si (KR); Sudhir Ramakrishna, Plano, TX (US); TaeYoung Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 389 days.

(21) Appl. No.: 12/848,433

(22) Filed: Aug. 2, 2010

(65) Prior Publication Data

US 2011/0051676 A1 Mar. 3, 2011

Related U.S. Application Data

(60) Provisional application No. 61/237,516, filed on Aug. 27, 2009, provisional application No. 61/281,337, filed on Nov. 16, 2009.

(51) Int. Cl.
*H04L 12/28* (2006.01)
*H04L 12/56* (2006.01)
*H04J 3/00* (2006.01)
*H04W 72/00* (2009.01)

(52) U.S. Cl.
USPC .............................. 370/394; 370/473; 455/450

(58) Field of Classification Search
USPC ......... 370/203, 208, 211, 315–330, 394, 473, 370/476, 478, 479, 480; 455/450
See application file for complete search history.

(56) References Cited

U.S. PATENT DOCUMENTS

| | | | |
|---|---|---|---|
| 6,781,998 B1 * | 8/2004 | Karlsson | 370/395.71 |
| 2006/0221930 A1 * | 10/2006 | Sweeney et al. | 370/351 |
| 2009/0116573 A1 * | 5/2009 | Gaal et al. | 375/267 |
| 2010/0009691 A1 * | 1/2010 | Choi et al. | 455/450 |
| 2011/0021224 A1 * | 1/2011 | Koskinen et al. | 455/507 |
| 2011/0070911 A1 * | 3/2011 | Zhang et al. | 455/509 |
| 2011/0134825 A1 * | 6/2011 | Kim et al. | 370/312 |
| 2012/0069808 A1 * | 3/2012 | Li et al. | 370/329 |

OTHER PUBLICATIONS

WIPO (and, Korean Patent Office) Written Opinion dated Jul. 21, 2010 and Search Report dated Oct. 21, 2010.*

* cited by examiner

*Primary Examiner* — Xavier Szewai Wong

(57) ABSTRACT

A base station for use in a wireless network that communicates with mobile stations according to the IEEE 802.16m standard. The base station transmits unicast data and E-MBS data in the downlink to mobile stations using physical resource units (PRUs) that are partitioned into a plurality of frequency partitions. The base station transmits E-MBS data using a first set of PRUs in at least a first common frequency partition, wherein the first set of PRUs are also used by at least a second base station to transmit E-MBS data. The base station further transmits unicast data using a second set of PRUs, wherein the second set of PRUs are randomized with respect to PRUs used by the at least a second base station to transmit unicast data.

24 Claims, 8 Drawing Sheets

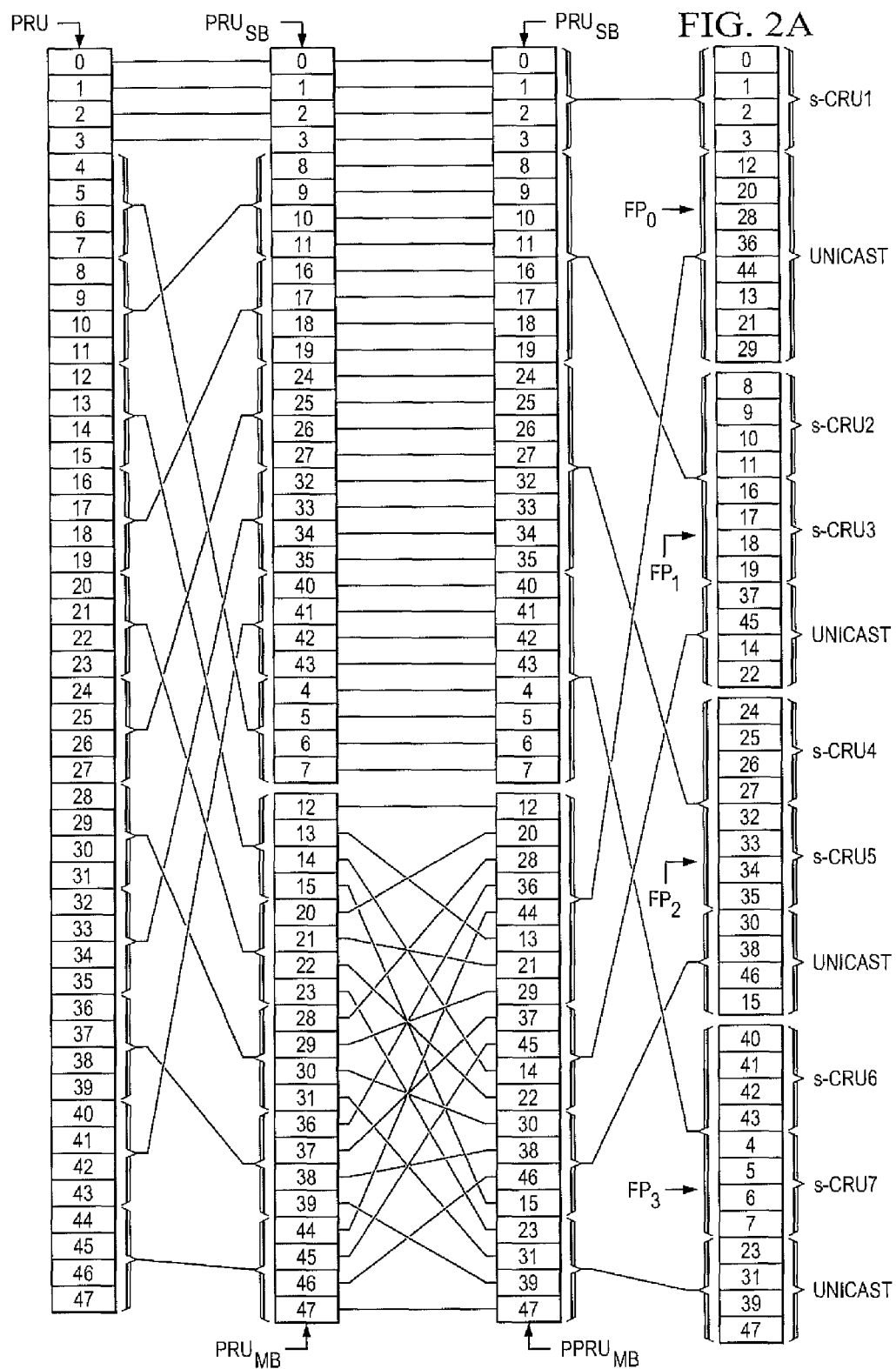

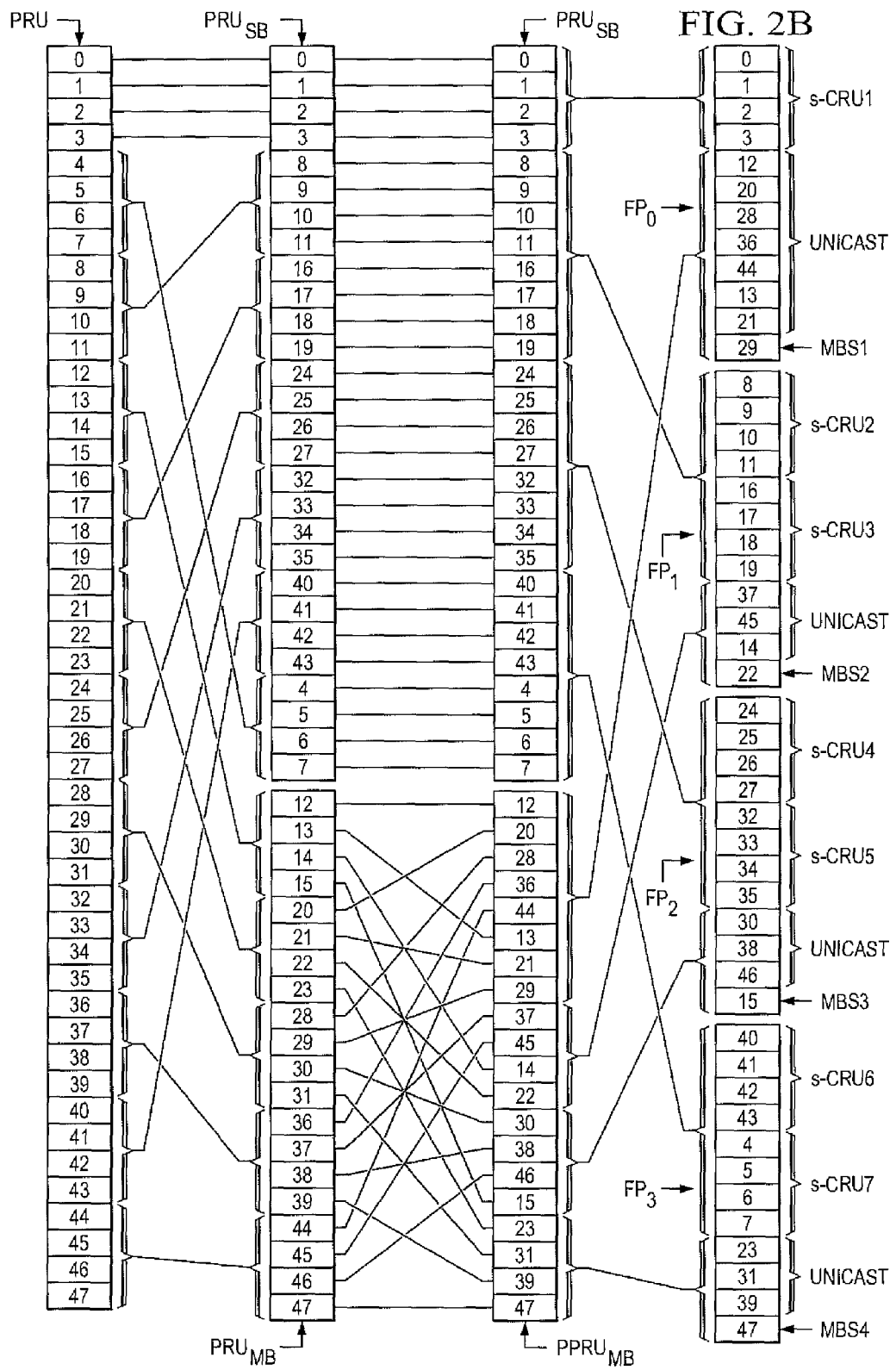

FIG. 6

| EMBS_RESOURCE _MULTIPLEXING _MODE | EMBS RESOURCE INDICATED:<br>- SF: INDICATES THE SUBFRAME RESERVED FOR E-MBS TRAFFIC<br>- FP_MBS: FREQUENCY PARTITION RESERVED FOR E-MBS | TDM/ FDM |
|---|---|---|
| 000 | SF = { 0 } ; FP = { 0 } | NONE |
| 001 | SF = LAST SF OF THE DL ZONE<br>FP_MBS = ALL FREQUENCY PARTITIONS | TDM |
| 010 | SF = LAST TWO SFs OF THE DL ZONE<br>FP_MBS = ALL FREQUENCY PARTITIONS | TDM |
| 011 | SF = LAST THREE SFs OF THE DL ZONE<br>FP_MBS = ALL FREQUENCY PARTITIONS | TDM |
| 100* | SF = LAST SF OF THE DL ZONE<br>FP_MBS = FPi WHERE i = LAST FREQUENCY PARTITION | FDM |
| 101* | SF = LAST TWO SFs OF THE DL ZONE<br>FP_MBS = FPi WHERE i = LAST FREQUENCY PARTITION | FDM |
| 110* | SF = LAST THREE SFs OF THE DL ZONE<br>FP_MBS = FPi WHERE i = LAST FREQUENCY PARTITION | FDM |
| 111 | SF = ALL SFs OF THE DL ZONE<br>FP_MBS = ALL FREQUENCY PARTITIONS | TDM |

FIG. 7

| EMBS_RESOURCE _MULTIPLEXING _MODE | EMBS RESOURCE INDICATED:<br>- SF: INDICATES THE SUBFRAME RESERVED FOR E-MBS TRAFFIC<br>- MBS_PRU_CT: NUMBER OF PRUs RESERVED FOR EMBS | TDM/ FDM |
|---|---|---|
| 000 | SF = { 0 }<br>MBS_PRU_CT = { 0 } | NONE |
| 001 | SF = LAST SF OF THE DL ZONE<br>MBS_PRU_CT = NPRU | TDM |
| 010 | SF = LAST TWO SFs OF THE DL ZONE<br>MBS_PRU_CT = NPRU | TDM |
| 011 | SF = LAST THREE SFs OF THE DL ZONE<br>MBS_PRU_CT = NPRU | TDM |
| 100* | SF = LAST SF OF THE DL ZONE<br>MBS_PRU_CT = 1 | FDM |
| 101* | SF = LAST TWO SFs OF THE DL ZONE<br>MBS_PRU_CT = 1 | FDM |
| 110* | SF = LAST THREE SFs OF THE DL ZONE<br>MBS_PRU_CT = 1 | FDM |
| 111 | SF = ALL SFs OF THE DL ZONE<br>MBS_PRU_CT = NPRU | TDM |

| EMBS_RESOURCE _INDICATOR | EMBS RESOURCE INDICATED:<br>- SF: INDICATES THE SUBFRAME RESERVED FOR E-MBS TRAFFIC<br>- FP_MBS: FREQUENCY PARTITION RESERVED FOR E-MBS |
|---|---|
| 000 | SF = LAST SF OF THE DL ZONE<br>FP_MBS = FP0<br>CRUE-MBS = $\left\lceil \dfrac{K_{SB,FP_0}}{4} \right\rceil$ |
| 001 | SF = LAST TWO SFs OF THE DL ZONE<br>FP_MBS = FP0<br>CRUE-MBS = $\left\lceil \dfrac{K_{SB,FP_0}}{4} \right\rceil$ |
| 010 | SF = LAST THREE SFs OF THE DL ZONE<br>FP_MBS = FP0<br>CRUE-MBS = $\left\lceil \dfrac{K_{SB,FP_0}}{4} \right\rceil$ |
| 011 | SF = LAST SF OF THE DL ZONE<br>FP_MBS = FP0<br>CRUE-MBS = $\left\lceil \dfrac{K_{SB,FP_0}}{2} \right\rceil$ |
| 100 | SF = LAST TWO SFs OF THE DL ZONE<br>FP_MBS = FP0<br>CRUE-MBS = $\left\lceil \dfrac{K_{SB,FP_0}}{2} \right\rceil$ |
| 101 | SF = LAST THREE SFs OF THE DL ZONE<br>FP_MBS = FP0<br>CRUE-MBS = $\left\lceil \dfrac{K_{SB,FP_0}}{2} \right\rceil$ |
| 110 | SF = LAST SF OF THE DL ZONE<br>FP_MBS = FP0<br>CRUE-MBS = $K_{SB,FP_0}$ |
| 111 | SF = LAST TWO SFs OF THE DL ZONE<br>FP_MBS = FP0<br>CRUE-MBS = $K_{SB,FP_0}$ |

FIG. 8

APPARATUS AND METHOD FOR RESOURCE SELECTION IN OFDMA SYSTEMS

CROSS-REFERENCE TO RELATED APPLICATION(S) AND CLAIM OF PRIORITY

The present application is related to U.S. Provisional Patent No. 61/237,516, filed Aug. 27, 2009, entitled "Methods For Resource Selection In Orthogonal Frequency Division Multiple Access Systems" and U.S. Provisional Patent No. 61/281,337, filed Nov. 16, 2009, entitled "Methods For Resource Selection In Orthogonal Frequency Division Multiple Access Systems". Provisional Patent Nos. 61/237,516 and 61/281,337 are assigned to the assignee of the present application and are hereby incorporated by reference into the present application as if fully set forth herein. The present application hereby claims priority under 35 U.S.C. §119(e) to U.S. Provisional Pat. Nos. 61/237,516 and 61/281,337.

TECHNICAL FIELD OF THE INVENTION

The present application relates generally to orthogonal frequency division multiple access (OFDMA) systems and, more specifically, to resource selection in OFDMA systems.

BACKGROUND OF THE INVENTION

Trends in the market for mobile broadband identify multimedia entertainment on wireless devices (e.g., smart phones, laptops) as one of the key drivers promoting the growth in higher data rates and improved user services. To support multimedia entertainment in next generation wireless systems, numerous wireless standards committees are promoting wireless standards that are optimized for the transmission of multimedia broadcast services. In the 3GPP standard, multimedia content is carried on Multimedia Broadcast Multicast Service (MBMS). In the 3GPP2 standard, multimedia content is carried on Broadcast Multicast Service (BCMCS). In the IEEE 802.16 standard, multimedia content is carried on Multicast Broadcast Service (MBS). The IEEE 802.16m standard, currently under development, is an enhanced update to the existing IEEE 802.16e standard. Consequently, the enhancements to MBS in IEEE 802.16m are termed Enhanced-MBS (E-MBS). Hereafter, E-MBS may be used generically to refer to MBS, E-MBS, and/or BCMCS.

There are differences in resource utilization in E-MBS transmissions and conventional base station-to-mobile station (BS-MS) unicast transmissions. A BS-MS unicast transmission is a transmission from the base station (or access point) to a given mobile station (e.g., smart phone, laptop, or other remote device) on the downlink (DL) or from the MS to the BS on the uplink (UL). Thus, the BS-MS link is a point-to-point link. As such, the signals from neighboring base stations are considered interference.

However, E-MBS transmissions, due to their broadcast nature, require that each BS transmits data to multiple user mobile stations. Thus, E-MBS is a point-to-multipoint link. However, the nature of E-MBS is such that the same data is transmitted from each base station to the mobile stations within the coverage area of each base station. Since the base stations are synchronized, the base stations transmit E-MBS data in a coordinated manner using the same set of resources, so that the E-MBS signals received by a mobile station from all neighboring base stations transmitting E-MBS data coherently add. Such a configuration is referred to as a single frequency network (SFN).

To support coordinated transmission of E-MBS data in a single frequency network, the resources selected for E-MBS transmissions across all cells must be the same. However, for unicast data, the resources must be randomized or permutated across the whole cell coverage area, so that the interference can be randomized and mitigated. Given the differences in the resource utilization, different resource partitioning schemes are used to support unicast and E-MBS transmissions. One such scheme separates E-MBS and unicast transmissions in time. Some time slots carry E-MBS data while other time slots carry unicast data. In this way, cell-specific permutations may be used for unicast data, while cell-common permutations are used for E-MBS data. Another scheme separates E-MBS data and unicast data by frequency, with some bandwidth allocated to E-MBS and other bandwidth allocated to unicast.

It is helpful to review the definitions of resource units and sub-channelization in the current IEEE 802.16m standards. To make resource utilization efficient, OFDM symbols are grouped to form a sub-frame. In IEEE 802.16m, six (6) OFDM symbols are used to form a regular sub-frame that is 0.625 milliseconds (ms) long. Eight (8) such regular sub-frames form a frame that is 5 milliseconds long. Four (4) frames make a super-frame (SF) that spans 20 milliseconds. To achieve granularity in resource utilization while keeping the signaling simple, the subcarriers in the OFDM symbols in a sub-frame are grouped to form resources. This portion of the time-frequency resource is sometimes called a resource block (RB) or a virtual resource block (VRB), a resource unit (RU) or a logical resource unit (LRU), or a resource channel (RCH). For the sake of convenience, this disclosure refers to a portion of the time-frequency resource as a resource unit (RU).

In IEEE 802.16m systems, a physical resource unit (PRU) is a rectangular tile made of eighteen (18) subcarriers in the frequency dimension and six (6) OFDM symbols in the time dimension. There are a total of $N_{PRU}$ PRUs over the entire bandwidth. For a 5 MHz system bandwidth, the value of $N_{PRU}=24$. For 10 MHz, the value of $N_{PRU}=48$ and for 20 MHz, the value of $N_{PRU}=96$. Other RU sizes, such as 18 subcarriers by 7 OFDM symbols (18×7) or 18×5, allow flexibility for different system configurations.

There are different types of time-frequency RUs, such as a distributed logical resource unit (distributed LRU) and a localized logical resource unit (localized LRU) in IEEE 802.16m systems. These RUs may be allocated for transmitting data packets. The allocation of these RUs is communicated to mobile stations via signaling messages or control channel messages. In the downlink of an OFDMA system, for example, in addition to transmitting a data packet, a base station communicates to the targeted mobile station(s) information regarding the resources allocated to the transmission of the data packet, so that the targeted mobile station knows which RUs must be decoded to retrieve the data packet.

Furthermore, PRUs are categorized as sub-band PRUs and mini-band PRUs. To mitigate interference in the network, the PRUs are partitioned into different frequency partitions, where a re-use factor is used to reduce interference in each partition. The conventional partitioning of these resources is described in "Draft Amendment to IEEE Standard For Local And Metropolitan Area Networks; Part 16: Air Interface for Broadband Wireless Access Systems; Advanced Air Interface," IEEE P802.16m/D1, July 2009, relevant excerpts of which are reproduced herein.

The number (K) of sub-bands (SB) in the $i^{th}$ frequency partition (FP) is denoted by $K_{SB,FP_i}$. The number (K) of mini-bands (MB) in the $i^{th}$ frequency partition (FP) is denoted by $K_{MB,FP_i}$. The size of the $i^{th}$ frequency partition is denoted by the field $FPS_i$ and the number of sub-bands in each frequency partition is denoted by the DFPSC field. Also, the number (L) of sub-band (SB) PRUs in the $i^{th}$ frequency partition is denoted by $L_{SB,FP_j}$ and is given by Equation 1:

$$L_{SB,FP_i} = N_1 K_{SB,FP_i},\qquad\text{[Eqn. 1]}$$

where $N_1=4$.

The number (L) of mini-band PRUs in the $i^{th}$ frequency partition is denoted by $L_{MB,FP_i}$ and is given by Equation 2:

$$L_{MB,FP_i} = N_2 K_{MB,FP_i},\qquad\text{[Eqn. 2]}$$

where $N_2=1$.

The number of sub-bands for each frequency partition when FPCT=1 or FPCT=4 is given by Equation 3:

$$K_{SB,FP_i} = \begin{cases} K_{SB} - (FPCT)\cdot FPSC & i=0 \\ FPSC & i>0. \end{cases}\qquad\text{[Eqn. 3]}$$

When DFPC=1 and FPCT=3, the number of sub-bands in $FP_i$ (for i>0) is given by Equation 4:

$$K_{SB,FP_i} = DFSPC.\qquad\text{[Eqn. 4]}$$

The number of mini-bands for each frequency partition is given by Equation 5:

$$K_{MB,FP_i} = \frac{FPS_i - K_{SB,FP_i} N_1}{N_2},\qquad\text{[Eqn. 5]}$$

for 0≤i≤FPCT.

The mapping of sub-band PRUs and mini-band PRUs to the frequency partition i is given by Equation 6:

$$PRU_{FP_i}(j) == \begin{cases} PRU_{SB}(k_1), & 0 \le j < FPCT \\ PPRU_{MB}(k_2), & L_{SB,FP_i} \le j < (L_{SB,FP_i}+L_{MB,FP_i}) \end{cases}\qquad\text{[Eqn. 6]}$$

where:

$k_1 = \Sigma_{m=0}^{i-1} L_{SB,FP_m} + j;$ and $k_2 = \Sigma_{m=0}^{i-1} L_{MB,FP_m} + j - L_{SB,FP_i}.$ There are different resource partitioning requirements to support unicast and E-MBS data transmissions in a single frequency network. However, current proposals of the IEEE 802.16m standard do not support such single frequency network transmissions. Therefore, there is a need in the art for a resource partitioning scheme that supports unicast and E-MBS data transmissions in an IEEE 802.16m wireless network. In particular, there is a need for specific schemes for splitting available bandwidth between E-MBS data and unicast data.

SUMMARY OF THE INVENTION

To address the above-discussed deficiencies of the prior art, it is a primary object to provide, a first base station for use in a wireless network capable of communicating with a plurality of mobile stations according to the IEEE 802.16m standard. The first base station transmits unicast data and E-MBS data in the downlink to mobile stations using physical resource units (PRUs) that are partitioned into a plurality of frequency partitions. The first base station transmits E-MBS data using a first set of PRUs in at least a first common frequency partition, wherein the first set of PRUs are also used by at least a second base station to transmit E-MBS data. The first base station further transmits unicast data using a second set of PRUs, wherein the second set of PRUs are randomized with respect to PRUs used by the at least a second base station to transmit unicast data.

It is a further object of the present disclosure to provide a method of downlink transmission for use in a wireless network capable of communicating with a plurality of mobile stations according to the IEEE 802.16m standard. The method comprises the steps of: i) partitioning physical resource units (PRUs) in the downlink from a first base station to mobile stations into a plurality of frequency partitions; ii) transmitting from the first base station E-MBS data using a first set of PRUs in at least a first common frequency partition, wherein the first set of PRUs are also used by at least a second base station to transmit E-MBS data; and iii) transmitting from the first base station unicast data using a second set of PRUs, wherein the second set of PRUs are randomized with respect to PRUs used by the at least a second base station to transmit unicast data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates an exemplary frequency partition in which the time-frequency resources in one or more frequency partitions may be reserved for E-MBS transmissions;

FIG. 2B illustrates an exemplary frequency partition in which the time-frequency resources in one or more frequency partitions may be reserved for E-MBS transmissions;

FIGS. 6 and 7 illustrate E-MBS resource multiplexing modes look-up tables according to this disclosure; and FIG. 8 illustrates an example of an E-MBS indicator lookup table according to this disclosure.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The following background reference documents are hereby incorporated by reference into the present disclosure as if fully set for the herein:

1) IEEE Std. No. 802.16e-2005, "IEEE Standard For Local And Metropolitan Area Networks, Part 16: Air Interface For Fixed And Mobile Broadband Wireless Access Systems, Amendment 2: Physical And Medium Access Control Layers For Combined Fixed And Mobile Operation In Licensed Bands" and IEEE Std. 802.16-2004/Cor1-2005, Corrigendum 1, December 2005;

2) "Draft Amendment to IEEE Standard For Local And Metropolitan Area Networks; Part 16: Air Interface for Broadband Wireless Access Systems; Advanced Air Interface," IEEE P802.16m/D1, July 2009; and Shkumbin Hamiti, "IEEE 802.16m System Description Document (Draft)", IEEE 802.16m-08/003r9a, May 31, 2009.

Figure 1:
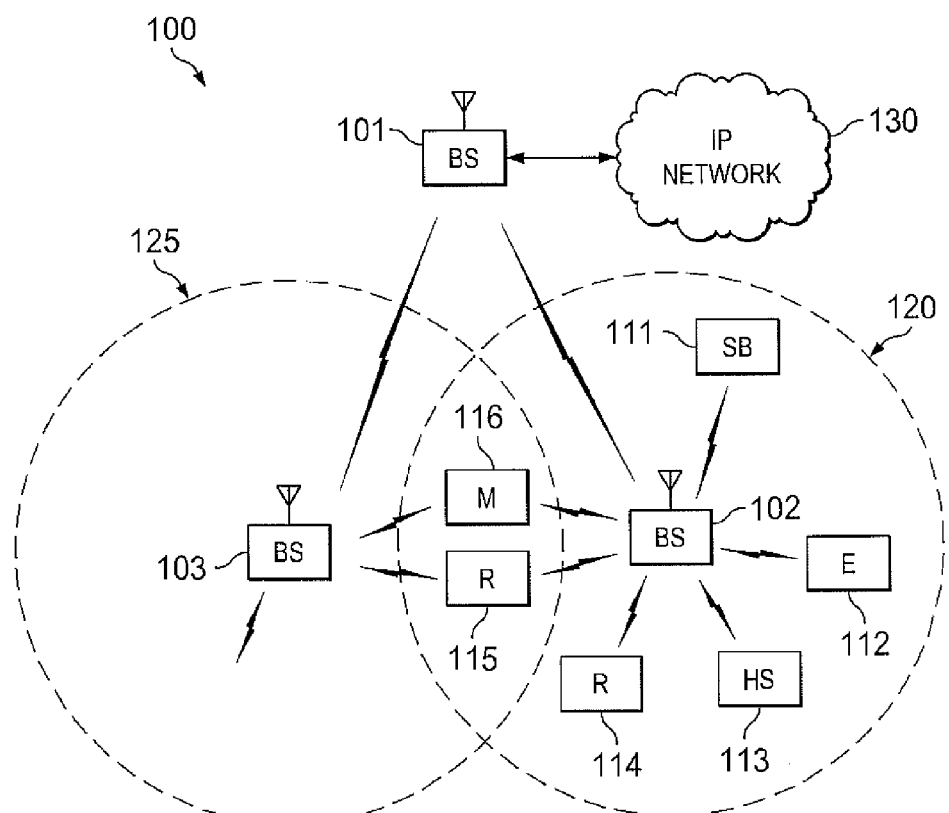
FIG. 1 illustrates a wireless network that supports frequency division multiplexing of unicast data and MBS data according to the principles of the present disclosure.

FIG. 1 illustrates wireless network 100, which supports frequency division multiplexing of unicast data and multicast-broadcast service (MBS) data according to one embodiment of the present disclosure. In FIG. 1, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network. In alternate embodiments, BS 102 and BS 103 directly access IP network 130 without communicating through BS 101.

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to network 130, via base station 101, to a first plurality of mobile stations within coverage area 120 of base station 102. Base station 103 provides wireless broadband access to IP network 130, via base station 101, to a second plurality of mobile stations within coverage area 125 of base station 103. The second plurality of mobile stations includes mobile station 115 and mobile station 116. The first plurality of mobile stations includes mobile station (MS) 111, mobile station (MS) 112, mobile station (MS) 113, mobile station (MS) 114, mobile station (MS) 115 and mobile station (MS) 116. In an exemplary embodiment, MS 111 may be located in a small business (SB), MS 112 may be located in an enterprise (E), MS 113 may be located in a WiFi hotspot (HS), MS 114 may be located in a first residence (R), MS 115 may be located in a second residence, and MS 116 may be a mobile (M) device.

For sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). Other well-known terms may be used instead of "mobile station", such as "subscriber station (SS)", "remote terminal (RT)", "wireless terminal (WT)", "user equipment (UE)", and the like.

In other embodiments, base station 101 may be in communication with either fewer or more base stations. It is noted that mobile station 115 and mobile station 116 are on the edge of both coverage area 120 and coverage area 125. Mobile station 115 and mobile station 116 each communicate with both base station 102 and base station 103 and may be said to be operating in handoff mode, as known to those of skill in the art.

In an exemplary embodiment, base stations 101-103 may communicate with each other and with mobile stations 111-116 in at least the downlink using an orthogonal frequency division multiplexing (OFDM) protocol according to the proposed IEEE 802.16m standard or an equivalent advanced 3G or 4G standard. More particularly, base stations 101-103 provide enhanced multicast-broadcast service or an equivalent E-MBS service, as well as unicast data service, to mobile stations 111-116 under the proposed IEEE 802.16m standard.

The system description document that contains the operational details of IEEE 802.16m system has accepted that frequency division multiplexing (FDM) is a multiplexing mode for enhanced multicast-broadcast service (E-MBS) and unicast transmissions. The present disclosure describes alterations to the current sub-channelization structure to support FDM of E-MBS and unicast transmissions.

To enable single-frequency network (SFN) operation, all cells (e.g., concurrent coordinated transmission in coverage area 120, coverage area 125) in the frequency network must use the same resource units. However, for single-cell transmissions (i.e., unicast) which randomize interference on the resources on which the mobile station (MS) data is transmitted, the cells do not use the same resource units. In fact, the cells randomly re-order the resource units by using the base station identification (BSID) number or each base station as the seed for a random generator.

Given the disparate requirements on the types of resource units, a partition of the time-frequency resources is preferred on the downlink (DL) to support frequency division multiplexing of E-MBS and unicast data. The present disclosure describes different techniques for partitioning that provide the following advantages. First, the signaling overhead for indicating the resource partition between E-MBS and unicast is minimized. Second, there is no degradation of unicast performance in any frequency partition configurations. Third, there is no alteration of the current sub-channelization formulas in IEEE 802.16m/D1 for unicast transmissions.

FIG. 2A illustrates an exemplary frequency partition in which the time-frequency resources in one or more frequency partitions may be reserved for E-MBS transmissions. In FIG. 2A, a 10 MHz bandwidth (BW) is divided into forty-eight (48) physical resource units (PRUs), which are grouped into four (4) frequency partitions (FPs) indexed from 0 to 3 (i.e., $FP_0$, $FP_2$, $FP_3$). The 48 PRUs are allocated into the 4 frequency partitions across all base stations (e.g., BS 102, BS 103) in network 100.

In FIG. 2A, the 48 PRUs (PRU0-PRU47) are allocated to either a sub-band ground ($PRU_{SB}$) for E-MBS transmissions or to a mini-band group ($PRU_{MB}$) for unicast transmissions. By way of example, the four PRUs, PRU0-PRU3, are allocated to $PRU_{SB}$ for E-MBS transmission and the four PRUs, PRU12-PRU15, are allocated to $PRU_{MB}$ for unicast transmission. Unlike the E-MBS PRUs in the $PRU_{SB}$ group, however, the unicast PRUs in the $PRU_{MB}$ group are permutated to form a permutated mini-band group (PPRU$_{MB}$). The permutated mini-bands undergo further randomizations that are unique to each base station to form a distribution resource unit (DRU). The size of a DRU is same as that of a mini-band PRU.

The PRUs in PRU$_{SB}$ and PPRU$_{MB}$ are then divided into the frequency partitions. For convenience in illustration, the PRU$_{SB}$ group is duplicated at the top of FIG. 2A. The four (4) sub-band resource units, PRU0-PRU3, are allocated into a first frequency partition, FP$_0$, to form a sub-band contiguous resource unit (s-CRU1). The eight (8) unicast permutated physical resource units, PPRU12, PPRU20, PPRU28, PPRU36, PPRU44, PPRU13, PPRU21, and PPRU19 are also allocated to FP$_0$. In a similar way, the remaining sub-band PRUs in the PRU$_{SB}$ group are allocated into s-CRU2 through s-CRU7 in FP$_1$, FP$_2$, and FP$_3$. Additionally, the remaining permutated resource units in the PPRU$_{MB}$ group are also allocated as unicast PRUs in FP$_1$, FP$_2$, and FP$_3$.

Embodiment 1

A first embodiment of the disclosure takes advantage of the fact that the frequency partitions are common across all base stations in the network to ensure effective interference coordination. Given that frequency partitions are coordinated across the entire network, the time-frequency resources (i.e., sub-frames and subcarriers) in one of the frequency partitions may be reserved for E-MBS transmissions. In this technique, the base station (BS) indicates to all mobile stations which frequency partition is reserved for E-MBS operations. Since the E-MBS traffic is limited to that reserved partition, any cell-common permutation may be applied over just the reserved partition and not impact other partitions that implement cell-specific permutations for unicast operations.

Not all downlink (DL) sub-frames in a frame carry E-MBS traffic. Thus, different E-MBS modes, called EMBS_RESOURCE_MULTIPLEXING_MODES, may be configured and these modes require different amounts of resources in the DL frame. There is a resource requirement associated with each mode that may be configured as a look-up table (LUT). An example of a lookup table is shown in TABLE 1. The EMBS_RESOURCE_MULTIPLEXING_MODES date field is carried in the super frame header (SFH). When a mobile station (e.g., MS 115) receives a sub-packet (SP-1) in the secondary-SFH (S-SFH), the mobile station determines the arrangement of the frequency partitions and the physical resource units (PRUs) in each frequency partition (FP). The E-MBS-related parameters are carried in another sub-packet of the SFH. When a mobile station receives and decodes E-MBS-related parameters in the SFH, the mobile station determines which sub-frames and frequency partitions are reserved for E-MBS. Thus, the mobile station may schedule sleep times and active times, avoiding unnecessary decoding and improving power saving.

Embodiment 2

A second embodiment of the disclosure takes advantage of Step 1 in the sub-channelization process, wherein sub-band contiguous resource units (s-CRUs) are allocated before sorting the resources into various frequency partitions. Thus, if E-MBS requires N PRUs in a given sub-frame for transmitting data, then $$\left\lceil \frac{N}{4} \right\rceil$$

s-CRUs are chosen for E-MBS transmission, where the notation $$\left\lceil \frac{N}{4} \right\rceil$$

indicates that the value N/4 is rounded up to the nearest integer. To enable such a selection, all base stations of the single-frequency network have at least $$\left\lceil \frac{N}{4} \right\rceil$$

s-CRUs. The E-MBS data is scheduled beginning in FP$_0$, and then is scheduled in FP$_1$, FP$_2$, and FP$_3$, as needed. Any extra s-CRU in that sub-frame and all the s-CRUs in the other sub-frames may be used for scheduling downlink data for mobile stations.

By way of example, in FIG. 2A, the s-CRUs in FP$_0$ (i.e., s-CRU1) are reserved for E-MBS transmissions. The E-MBS MODE transmitted in the SFH indicates which sub-frames have E-MBS traffic and how many of the s-CRUs in FP$_0$ are reserved for E-MBS. In FIG. 2A, there is only one s-CRU in FP$_0$ in all the sub-frames of the super-frame. If there is more than one s-CRU, then the other s-CRUs not used for E-MBS may be used to support unicast traffic.

Alternatively, a base station may use the s-CRUs in any frequency partition or all frequency partitions. From the sub-channelization process illustrated in FIG. 2A, it can be seen that the s-CRUs are sequentially allocated to each frequency partition without performing any cell-specific permutation. Using the information in the look-up table corresponding to E-MBS modes, it is possible to index both the s-CRU and its frequency partition as resources that carry E-MBS traffic. Compared to the first embodiment described above, a finer resolution is achieved in indicating the resources used for E-MBS, namely, from an entire frequency partition to just the s-CRUs in the frequency partition.

Embodiment 3

In a third embodiment of the disclosure, a pre-defined number of PRUs (given by MBS_PRU_CT) from every frequency partition may be reserved for E-MBS. FIG. 2B illustrates an exemplary frequency partition in which an equitable number of time-frequency resources in every frequency partition are reserved for E-MBS transmissions. FIG. 2B illustrates the frequency partitioning for BW=10 MHz, K$_{SB}$=7, FPCT=4, FPS$_0$=FPS$_i$=12, and DFPSC=2, and MBS_PRU_CT=1.

FIG. 2B is similar to FIG. 2A in most respects. However, in FIG. 2B, MBS1 indicates that PRU29 in FP$_0$ is reserved is reserved for E-MBS data, MBS2 indicates that PRU22 in FP$_1$ is reserved is reserved for E-MBS data, MBS3 indicates that PRU15 in FP$_2$ is reserved is reserved for E-MBS data, and MBS4 indicates that PRU47 in FP$_4$ is reserved is reserved for E-MBS data.

The variable MBS_PRU_CT is defined as the number of PRUs reserved for E-MBS in every frequency partition and is derived from the mini-band portion of PRUs. We define:

$$L_{MBS,FP_i} = N_2 \text{MBS\_PRU\_CT}. \quad [\text{Eqn. 7}]$$

The resource reserved for E-MBS (i.e., $L_{MBS,FP_i}$) is subtracted from the number of mini-bands in a frequency partition. Thus, Equation 5 is modified to reflect this resource reservation, as shown in Equation 8:

$$K_{MB,FP_i} = \frac{FPS_i - K_{SB,FP_i} N_1}{N_2} - L_{MBS,FP_I} \quad [\text{Eqn. 8}]$$

for $0 \leq i \leq FPCT$.

The mapping of sub-band PRUs, mini-band PRUs and E-MBS PRUs to the $i^{th}$ frequency partition is given by Equation 9:

$$PRU_{FP_i}(j) = \quad [\text{Eqn. 9}]$$

$$\begin{cases} PRU_{SB}(k_1), & 0 \leq j < L_{SB,FP_i} \\ PPRU_{MB}(k_2), & L_{SB,FP_i} \leq j < (L_{MB,FP_i} + L_{SB,FP_i}) \\ PPRU_{MB}(k_3), \\ (L_{MB,FP_i} + L_{SB,FP_i}) \leq j < (L_{MB,FP_i} + L_{SB,FP_i} + L_{MBS,FP_i}) \end{cases}$$

where:

$k_1 = \sum_{m=0}^{i-1} L_{SB,FP_m} + j$;

$k_2 = \sum_{m=0}^{i-1} L_{MB,FP_m} + j - L_{SB,FP_i}$; and $k_3 = \sum_{m=0}^{i-1} L_{MB,FP_m} + \sum_{m=0}^{i-1} L_{MBS,FP_M} + j - L_{SB,FP_i}$.

The total number of contiguous resource units (CRUs) in frequency partition $FP_i$ for $0 \leq i \leq FPCT$ is denoted as $L_{CRU,FP_i}$, where $L_{CRU,FP_i} = L_{SB,FP_i} + L_{MB,FP_i} + L_{MBS,FP_i}$.

Figure 3:
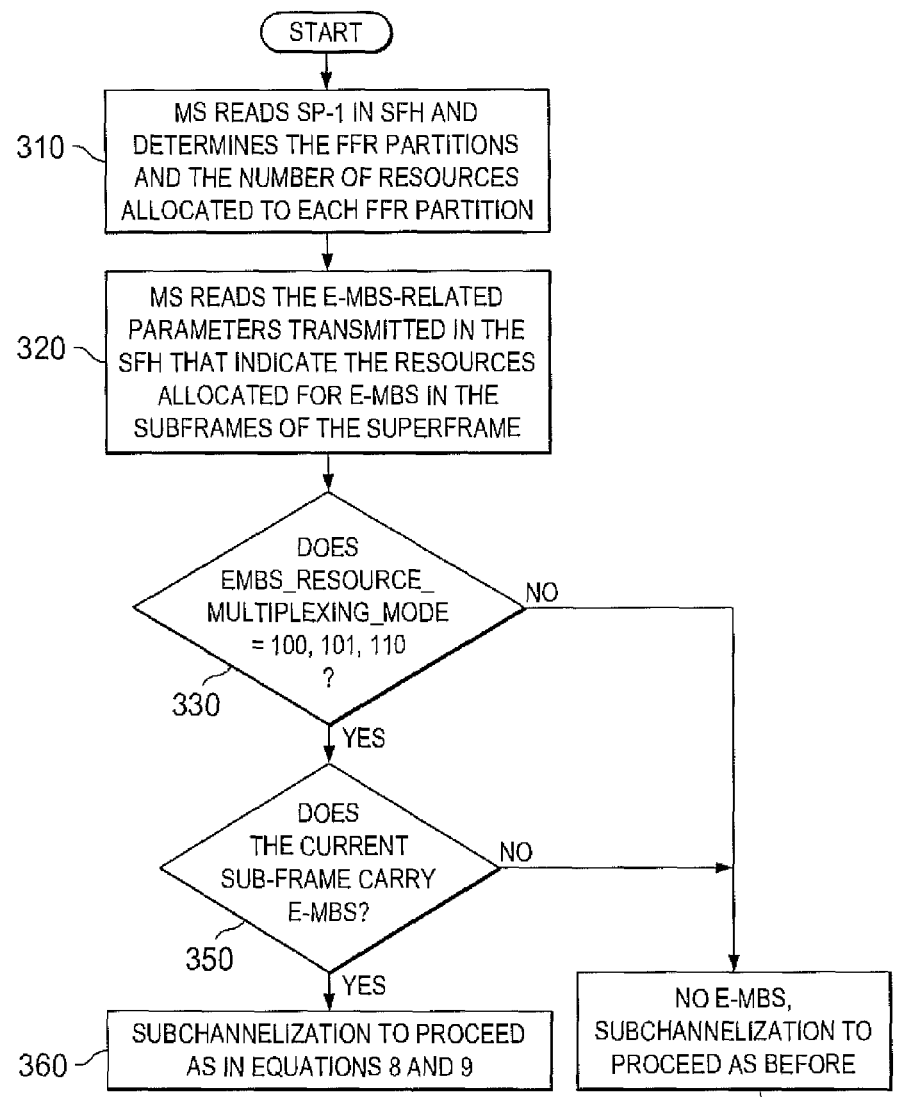
FIG. 3 is a flow diagram illustrating selective use of sub-channelization to support frequency division multiplexing in specific subframes in one embodiment of the disclosure.

FIG. 3 is a flow diagram illustrating selective use of sub-channelization to support frequency division multiplexing (FDM) in specific subframes according to an exemplary embodiment of the present disclosure. This enables a mobile station to schedule sleep times and active times, to avoid unnecessary decoding, and to improve power savings.

Not all DL sub-frames in a frame carry E-MBS traffic. Different E-MBS modes, called the EMBS_RESOURCE_MULTIPLEXING_MODES, may be configured. These modes require different amounts of resources in the DL sub-frames. Thus, associated with each one of the EMBS_RESOURCE_MULTIPLEXING_MODES, there is a resource requirement that can be configured as a look-up table (LUT). An example of the look-up table is in TABLE 2. The E-MBS resource mode information is carried in a control channel, such as the SFH.

It should be noted the SFH, the Advanced Air Interface—E-MBS—Configuration (AAI_EMBS)_CFG message and the Advanced Air Interface—System Configuration Descriptor (AAI_SCD) message are examples of control channels that can be decoded and understood by all mobile stations. In this disclosure, the use of a particular control channel to carry partitioning or other control information is by way of example only and should not be construed to limit the scope of the disclosure in any way. Generally, partitioning and other types of configuration or control information may be carried in more than one types of control channels.

Initially, a mobile station (e.g., MS 115) receives a control message in a sub-packet (SP-1) in the super frame header (SFH) or secondary-SFH (S-SFH). The control message allows the mobile station to determine how the frequency partitions are arranged and the resources allocated in each frequency partition (step 310). The E-MBS-related parameters, like the EMBS_RESOURCE_MULTIPLEXING_MODES, are carried in another sub-packet of the SFH. The mobile station reads (decodes) the E-MBS-related parameters that indicate the resources allocated to E-MBS in the sub-frames reserved for E-MBS (step 320).

The alternate sub-channelization applies only to those sub-frames. Thus, if EMBS_RESOURCE_MULTIPLEXING_MODES=100, 101, or 110, for example, (Yes in step 330), and if the current subframe carries E-MBS data (Yes in step 350), then sub-channelization proceeds as in Equations 8 and 9 (step 360). Otherwise, for the remaining sub-frames, sub-channelization proceeds as in the case where E-MBS is not present (step 340). Then the original formulas in Equations 5 and 6 are applicable.

Embodiment 4

In a fourth embodiment of the disclosure, the E-MBS resources are chosen from frequency partition $FP_0$. To do this, a B-bit value, EMBS_RU_COUNT, is transmitted from the base station to the mobile station in the sub-packet. The value is interpreted as follows. First, if EMBS_EXISTS is 1 and EMBS_RU_COUNT is 0, this indicates that E-MBS traffic occupies the entire set of sub-frame(s) indicated by the EMBS_SF_COUNT parameter. In such a case, the number of PRUs in the sub-frame allocated to E-MBS traffic, denoted as $L_{EMBS}$, is given by $L_{EMBS} = N_{PRU}$. Second, if EMBS_EXISTS is 1 and EMBS_RU_COUNT is non-zero, this indicates the number of PRUs in $FP_0$ allocated to E-MBS traffic in units of N1 PRUs. In this case, the number of PRUs in the sub-frame allocated to E-MBS traffic in $FP_0$, denoted as $L_{EMBS}$, is given by $L_{EMBS} = N1 * \text{EMBS\_RU\_COUNT}$.

In the following, the term $DRU_{EMBS}$ refers to a logical distributed resource unit that is used to support E-MBS traffic, as opposed to a DRU which is used to support unicast traffic. This is purely a distinction in terminology. A $DRU_{EMBS}$ has the same size as a DRU. This distinction in terminology is made purely to avoid confusion with respect to the operations on DRUs defined herein. The mapping defining $DRU_{EMBS}$ is described by the following equations for the case where EMBS_EXISTS=1 and EMBS_RU_COUNT=0:

$$DRU_{EMBS}[j] = PRU[j], \quad [\text{Eqn. 10}]$$

for $0 \leq j \leq L_{EMBS} = N_{PRU}$.

For those cases in which EMBS_EXISTS=1 and EMBS_RU_COUNT>0, then:

$$DRU_{EMBS}[j] = PRU_{FP_0}[j + L_{SB,FP_0} + L_{MB,FP_0} - L_{EMBS}] \quad [\text{Eqn. 11}]$$

for $0 \leq j \leq L_{EMBS}$.

In this case, the last $L_{EMBS}$ PRUs of $FP_0$ are reserved for E-MBS traffic.

Embodiment 5

In a fifth embodiment of the disclosure, M PRUs are reserved for E-MBS from the available N PRUs. The remaining N-M PRUs are then sub-channelized and allocated to frequency partitions, as shown in FIG. 2A. Under this approach, PRUs are removed even before frequency partitioning is applied. The M PRUs reserved for E-MBS are common across all base stations that form the single frequency network. Therefore, the frequency partitioning applied will also be common across all base stations that form the single frequency network.

Embodiment 6

In a sixth embodiment of the disclosure, the multiplexing of E-MBS traffic and unicast traffic is guided by two constraints. First, E-MBS traffic may be carried on any number of the sub-frames allocated to the downlink of a frame. All frames of the super-frame have the same number of sub-frames reserved for E-MBS traffic. Second, in the sub-frame(s) in which E-MBS traffic is carried, the E-MBS traffic is frequency division multiplexed with the unicast traffic. That is, a set of resource units in each sub-frame(s) shall be reserved for E-MBS traffic. The resource units reserved in each sub-frame are CRUs units.

Resources reserved for E-MBS are indicated in the E-MBS_RESOURCE_INDICATOR field in the AAI-E-MBS_CFG message. These resources are valid for the set of super-frames over which the AAI-E-MBS_CFG indicators are valid. An example of an E-MBS resource indicator is shown in TABLE 3.

Embodiment 7

In a seventh embodiment of the disclosure, the multiplexing of E-MBS traffic and unicast traffic is guided by two constraints. First, E-MBS traffic may be carried on any number of the sub-frames allocated to the downlink of a frame. All frames of the super-frame have the same number of sub-frames reserved for E-MBS traffic. Second, in the sub-frame(s) in which E-MBS traffic is carried, the E-MBS traffic is frequency division multiplexed with the unicast traffic. That is, a set of resource units in each sub-frame(s) shall be reserved for E-MBS traffic. The resource units reserved in each sub-frame are CRUs units.

Figure 4:
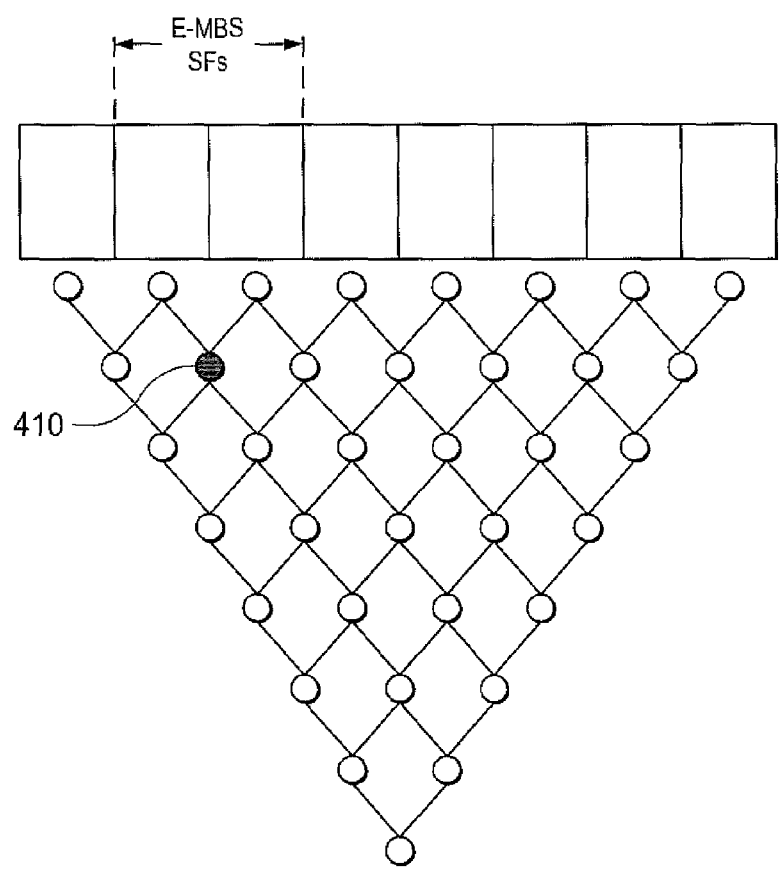
FIG. 4 is a tree diagram that indexes the sub-frame that carry E-MBS traffic in a frame.

Resources reserved for E-MBS are indicated in the E-MBS_RESOURCE_INDICATOR field in AAI-E-MBS_CFG message. These resources are valid for the set of super-frames over which the AAI-E-MBS_CFG indicators are valid. The E-MBS_RESOURCE_INDICATOR is a bit-field consisting of eight (8) bits, namely $b_0$-$b_7$, interpreted as follows. First, the 6 bits [$b_0$-$b_5$] indicate the sub-frame indices that carry E-MBS traffic in the frame. The sub-frame indices may be a bitmap if the number of downlink sub-frames are less than 5, may be a look-up table where 32 different combinations of sub-frames may be listed, or may be indexed using a tree structure as shown in FIG. 4. FIG. 4 is a tree diagram that indexes the sub-frame that carry E-MBS traffic in a frame. For example, in FIG. 4, bits [$b_0$-$b_5$] index node 410 in the tree structure, which indicates that the two subframes that branch out from node 410 are used to E-MBS traffic.

Second, the 2 bits [$b_6 b_7$] indicate the different number of sub-band CRUs that may be reserved for E-MBS traffic in each of the sub-frames. The two bits may be interpreted using a look-up table or may be indexed using a tree structure.

Embodiment 8

In an eighth embodiment of the disclosure, the multiplexing of E-MBS traffic and unicast traffic is guided by two constraints. First, E-MBS traffic may be carried on any number of the sub-frames allocated to the downlink of a frame. All frames of the super-frame have the same number of sub-frames reserved for E-MBS traffic. Second, in the sub-frame(s) in which E-MBS traffic is carried, the E-MBS traffic is frequency division multiplexed with the unicast traffic. That is, a set of resource units in each sub-frame(s) shall be reserved for E-MBS traffic. The resource units reserved in each sub-frame are in the units of sub-band CRUs.

Resources reserved for E-MBS are indicated in two fields, namely, E-MBS_SUBFRAME_INDICATOR and E-MBS_SUBBAND_INDICATOR in the AAI-E-MBS_CFG message. These resources are valid for the set of super-frames over which the AAI-E-MBS_CFG indicators are valid. The E-MBS_SUBFRAME_INDICATOR indicates which sub-frames in a frame carry E-MBS traffic and is a bit-field consisting of three (3) bits [$b_0 b_1 b_2$] interpreted as follows:

$b_0$ $b_1$ $b_2$=000: Last 1 sub-frame of the DL zone
$b_0$ $b_1$ $b_2$=001: Last 2 sub-frames of the DL zone
$b_0$ $b_1$ $b_2$=010: Last 3 sub-frames of the DL zone
$b_0$ $b_1$ $b_2$=011: Last 4 sub-frames of the DL zone
$b_0$ $b_1$ $b_2$=100: Last 5 sub-frames of the DL zone
$b_0$ $b_1$ $b_2$=101: Last 6 sub-frames of the DL zone
$b_0$ $b_1$ $b_2$=110: Last 7 sub-frames of the DL zone
$b_0$ $b_1$ $b_2$=111: Last 8 sub-frames of the DL zone The E-MBS_SUBBAND_INDICATOR is a five (5) bit field that indicates the number of sub-bands reserved for E-MBS traffic in the downlink portion of the frames. There are at most 21 sub-bands in a 20 MHz bandwidth. The 5 bits [$s_0 s_1 s_2 s_3 s_4$] are interpreted as follows. The E-MBS_SUBBAND_INDICATOR indicates the number of sub-band CRUs beginning from the first sub-band CRU index. For example, [$s_0 s_1 s_2 s_3 s_4$]=00000 indicates the first sub-band CRU is reserved for E-MBS data and [$s_0 s_1 s_2 s_3 s_4$]=00111 indicates that 8 sub-band CRUs, from the first to the eighth CRU, are reserved for E-MBS data.

Embodiment 9

In a ninth embodiment of the disclosure, the multiplexing of E-MBS traffic and unicast traffic is guided by two constraints. First, E-MBS traffic may be carried on any number of the sub-frames allocated to the downlink of a frame. All frames of the super-frame have the same number of sub-frames reserved for E-MBS traffic. Second, in the sub-frame(s) in which E-MBS traffic is carried, the E-MBS traffic is frequency division multiplexed with the unicast traffic. That is, a set of resource units in each sub-frame(s) shall be reserved for E-MBS traffic. The resource units reserved in each sub-frame are in the units of sub-band CRUs.

Resources are reserved for E-MBS traffic on a per-zone basis. For each E-MBS zone, the resources reserved for that E-MBS zone are indicated in two fields, namely, E-MBS_SUBFRAME_INDICATOR and E-MBS_SUBBAND_INDICATOR in the AAI-E-MBS_CFG message. These resources are valid for the set of super-frames over which the AAI-E-MBS_CFG indicators are valid. The E-MBS_SUBFRAME_INDICATOR indicates which subframes in a frame carry the E-MBS traffic for the E-MBS zone. The E-MBS_SUBFRAME_INDICATOR is a bit-field consisting of 3 bits [$b_0 b_1 b_2$] interpreted as follows:

$b_0$ $b_1$ $b_2$=000: Last 1 sub-frame of the DL zone
$b_0$ $b_1$ $b_2$=001: Last 2 sub-frames of the DL zone
$b_0$ $b_1$ $b_2$=010: Last 3 sub-frames of the DL zone
$b_0$ $b_1$ $b_2$=011: Last 4 sub-frames of the DL zone
$b_0$ $b_1$ $b_2$=100: Last 5 sub-frames of the DL zone
$b_0$ $b_1$ $b_2$=101: Last 6 sub-frames of the DL zone
$b_0$ $b_1$ $b_2$=110: Last 7 sub-frames of the DL zone
$b_0$ $b_1$ $b_2$=111: Last 8 sub-frames of the DL zone The E-MBS_SUBBAND_INDICATOR is a five (5) bit field that indicates the number of sub-bands reserved for the E-MBS zone traffic in the downlink portion of the frames. There are at most 21 sub-bands in a 20 MHz bandwidth.

Figure 5:
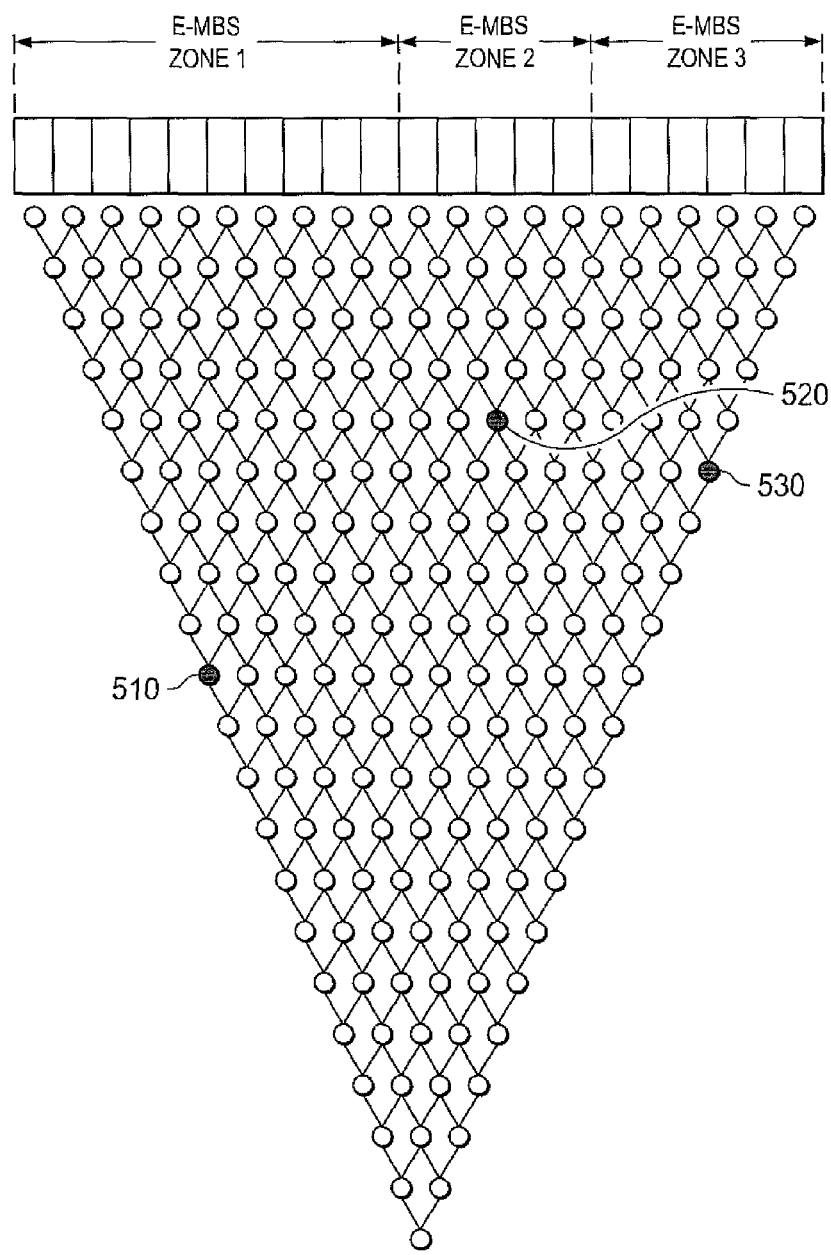
FIG. 5 is a tree diagram that indexes the sub-bands reserved to E-MBS zones.

FIG. 5 is a tree diagram that indexes the sub-bands reserved to E-MBS zones. Sub-bands reserved for an E-MBS zone may be indicated by indexing a node of the tree. In FIG. 5, the tree has at most 231 nodes corresponding to 21 sub-bands in a 20 MHz bandwidth, which is then indexed using the 8 bits. The node then indicates the sub-bands reserved for the said E-MBS Zone. For example, node 510 indexes the sub-bands in E-MBS ZONE 1, node 520 indexes the sub-bands in E-MBS ZONE 2, and node 530 indexes the sub-bands in E-MBS ZONE 3.

Embodiment 10

In another embodiment of the disclosure, the multiplexing of E-MBS traffic and unicast traffic is guided by two constraints. First, E-MBS traffic may be carried on any number of the sub-frames allocated to the downlink of a frame. All frames of the super-frame have the same number of sub-frames reserved for E-MBS traffic. Second, in the sub-frame(s) in which E-MBS traffic is carried, the E-MBS traffic is frequency division multiplexed with the unicast traffic. That is, a set of resource units in each sub-frame(s) shall be reserved for E-MBS traffic. The resource units reserved in each sub-frame are in the units of sub-band CRUs.

Resources reserved for E-MBS are indicated in two fields, namely E-MBS_SUBFRAME_INDICATOR and E-MBS_SUBBAND_INDICATOR in the AAI-E-MBS_CFG message. The E-MBS_SUBFRAME_INDICATOR is a common message for all E-MBS zones while the E-MBS_SUBBAND_INDICATOR indicates the sub-bands reserved for each E-MBS zone. These resources are valid for the set of super-frames over which the AAI-E-MBS_CFG indicators are valid. The E-MBS_SUBFRAME_INDICATOR indicates which sub-frames in a frame carry E-MBS traffic in all E-MBS zones and is a bit-field consisting of 3 bits [$b_0 b_1 b_2$] interpreted as follows:

$b_0 b_1 b_2$=000: Last 1 sub-frame of the DL zone
$b_0 b_1 b_2$=001: Last 2 sub-frames of the DL zone
$b_0 b_1 b_2$=010: Last 3 sub-frames of the DL zone
$b_0 b_1 b_2$=011: Last 4 sub-frames of the DL zone
$b_0 b_1 b_2$=100: Last 5 sub-frames of the DL zone
$b_0 b_1 b_2$=101: Last 6 sub-frames of the DL zone
$b_0 b_1 b_2$=110: Last 7 sub-frames of the DL zone
$b_0 b_1 b_2$=111: Last 8 sub-frames of the DL zone The E-MBS_SUBBAND_INDICATOR is a five (5) bit field that indicates the number of sub-bands reserved for each E-MBS zone in the downlink portion of the frames. There are at most 21 sub-bands in a 20 MHz bandwidth. Sub-bands reserved for the E-MBS zone are indicated by indexing the node of the tree as shown in FIG. 5. The tree has at most 231 nodes corresponding to 21 sub-bands in a 20 MHz bandwidth, which is then indexed using the 8 bits. The node then indicates the sub-bands reserved for the E-MBS Zone.

Embodiment 11

In an eleventh embodiment of the disclosure, the multiplexing of E-MBS traffic and unicast traffic is guided by two constraints. First, E-MBS traffic may be carried on most of the sub-frames allocated to the downlink in a frame. All frames of the super-frame have the same number of sub-frames reserved for E-MBS traffic. Second, in the sub-frame(s) where E-MBS traffic is carried, the E-MBS traffic is frequency division multiplexed with the unicast traffic. That is, a set of resource units in each sub-frame(s) is reserved for E-MBS traffic. The resource units reserved in each sub-frame are in units of sub-band CRUs. Only those sub-frames having sub-band CRUs carry E-MBS traffic.

Resources reserved for E-MBS in each subframe are indicated by E-MBS_SUBBAND_INDICATOR in the AAI-E-MBS_CFG message. The E-MBS_SUBBAND_INDICATOR indicates the sub-bands reserved for each E-MBS zone. These resources are valid for the set of super-frames over which the AAI-E-MBS_CFG indicators are valid. The E-MBS_SUBBAND_INDICATOR is a five (5) bit field that indicates the number of sub-bands reserved for the each E-MBS zone in the downlink portion of the frames. There are at most 21 sub-bands in a 20 MHz bandwidth. Sub-bands reserved for the E-MBS zone are indicated by indexing the node of the tree as shown in FIG. 5.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network configured to communicate with a plurality of mobile stations, a first base station configured to transmit unicast data and Enhanced Multicast Broadcast Service (E-MBS) data in a downlink to mobile stations using physical resource units (PRUs) that are partitioned into a plurality of frequency partitions,
   wherein the first base station is configured to transmit E-MBS data using a first set of PRUs in at least a first common frequency partition,
   wherein the first set of PRUs are also used by at least a second base station configured to transmit E-MBS data,
   wherein at least a second set of PRUs are permutated to form permuted band groups and the permutated band groups are randomized to form randomized band groups, and
   wherein the first and at least the second base stations are configured to transmit unicast data over randomized band groups that are unique to each base station.

2. The first base station as set forth in claim 1, wherein the first set of PRUs comprises at least one sub-band contiguous resource unit.

3. The first base station as set forth in claim 1, wherein the first set of PRUs is reserved for transmitting E-MBS data in all common frequency partitions of the wireless network.

4. The first base station as set forth in claim 1, wherein the first base station is configured to transmit to the mobile stations a control message that enables the mobile stations to determine how frequency partitions are arranged in the wireless network.

5. The first base station as set forth in claim 4, wherein the control message further enables the mobile stations to determine the allocation of PRUs in each frequency partition in the wireless network.

6. The first base station as set forth in claim 5, wherein the control message is transmitted in a control channel of the downlink.

7. The first base station as set forth in claim 5, wherein the control message identifies the first set of PRUs using a look-up table.

8. The first base station as set forth in claim 5, wherein the control message identifies the first set of PRUs by indexing a tree diagram.

9. A wireless network, comprising:
   a plurality of base stations configured to communicate with a plurality of mobile stations,
   wherein a first base station is configured to transmit unicast data and Enhanced Multicast Broadcast Service (E-MBS) data in a downlink to mobile stations using physical resource units (PRUs) that are partitioned into a plurality of frequency partitions, and wherein the first base station is configured to transmit E-MBS data using a first set of PRUs in at least a first common frequency partition, wherein the first set of PRUs are also used by at least a second base station configured to transmit E-MBS data, wherein a second set of PRUs are permutated to form permuted band groups and the permutated band groups are randomized to form randomized band groups, and wherein the first and at least the second base stations are configured to transmit unicast data over randomized band groups that are unique to each base station.

10. The wireless network as set forth in claim 9, wherein the first set of PRUs comprises at least one sub-band contiguous resource unit.

11. The wireless network as set forth in claim 9, wherein the first set of PRUs is reserved for transmitting E-MBS data in all common frequency partitions of the wireless network.

12. The wireless network as set forth in claim 9, wherein the first base station is configured to transmit to the mobile stations a control message that enables the mobile stations to determine how frequency partitions are arranged in the wireless network.

13. The wireless network as set forth in claim 12, wherein the control message further enables the mobile stations to determine the allocation of PRUs in each frequency partition in the wireless network.

14. The wireless network as set forth in claim 13, wherein the control message is transmitted in a control channel of the downlink.

15. The wireless network as set forth in claim 13, wherein the control message identifies the first set of PRUs using a look-up table.

16. The wireless network as set forth in claim 13, wherein the control message identifies the first set of PRUs by indexing a tree diagram.

17. A method of downlink transmission for use in a wireless network configured to communicate with a plurality of mobile stations, the method comprising:

partitioning physical resource units (PRUs) in a downlink from a first base station to mobile stations into a plurality of frequency partitions;

transmitting from the first base station Enhanced Multicast Broadcast Service (E-MBS) data using a first set of PRUs in at least a first common frequency partition, wherein the first set of PRUs are also used by at least a second base station to transmit E-MBS data; and transmitting from the first base station using a second set of PRUs, wherein the second set of PRUs are permutated to form permuted band groups and the permutated band groups are randomized to form randomized band groups, and wherein the first and at least the second base stations transmit the unicast data over the randomized band groups that are unique to each base station.

18. The method as set forth in claim 17, wherein the first set of PRUs comprises at least one sub-band contiguous resource unit.

19. The method as set forth in claim 17, wherein the first set of PRUs is reserved for transmitting E-MBS data in all common frequency partitions of the wireless network.

20. The method as set forth in claim 17, further comprising transmitting from the first base station a control message that enables the mobile stations to determine how frequency partitions are arranged in the wireless network.

21. The method as set forth in claim 20, wherein the control message further enables the mobile stations to determine the allocation of PRUs in each frequency partition in the wireless network.

22. The method as set forth in claim 21, wherein the control message is transmitted in a control channel of the downlink.

23. The method as set forth in claim 21, wherein the control message identifies the first set of PRUs using a look-up table.

24. The method as set forth in claim 21, wherein the control message identifies the first set of PRUs by indexing a tree diagram.

\* \* \* \* \*